United States Patent
Tomioka (10) Patent No.: US 8,749,837 B2
(45) Date of Patent: Jun. 10, 2014

(54) IMAGE FORMING APPARATUS EQUIPPED WITH LIGHT SCANNING DEVICE

(71) Applicant: Kyocera Document Solutions Inc., Osaka (JP)

(72) Inventor: Hiroyuki Tomioka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/664,556

(22) Filed: Oct. 31, 2012

(65) Prior Publication Data

US 2013/0107328 A1 May 2, 2013

(30) Foreign Application Priority Data

Oct. 31, 2011 (JP) .................................. 2011-238203

(51) Int. Cl.
*H04N 1/04* (2006.01)

(52) U.S. Cl.
USPC ............. 358/1.2; 358/474; 358/498; 358/497

(58) Field of Classification Search
USPC ............................ 358/1.2, 474, 498, 497, 496
See application file for complete search history.

(56) References Cited

U.S. PATENT DOCUMENTS

| | | |
|---|---|---|
| 5,417,507 A | 5/1995 | Uno et al. |
| 2006/0061865 A1 | 3/2006 | Shima et al. |
| 2006/0082639 A1 | 4/2006 | Kojima |
| 2006/0164661 A1 * | 7/2006 | Kaima ........................ 358/1.2 |
| 2008/0025750 A1 * | 1/2008 | Yamazaki et al. ............. 399/92 |
| 2012/0269551 A1 | 10/2012 | Iwai |

FOREIGN PATENT DOCUMENTS

| | | |
|---|---|---|
| JP | 08-205460 A | 8/1996 |
| JP | 2000-330061 | 11/2000 |
| JP | 2004-333844 A | 11/2004 |
| JP | 2006-010814 A | 1/2006 |
| JP | 2006-227577 | 8/2006 |
| JP | 2010-078836 A | 4/2010 |

* cited by examiner

*Primary Examiner* — Houshang Safaipour
(74) *Attorney, Agent, or Firm* — Morgan, Lewis & Bockius LLP (57) ABSTRACT

A light scanning device equipped with a housing that houses lenses, a rotating multifaceted mirror, and a motor for driving rotation of the rotating multifaceted mirror, and has a bearing section for rotatably supporting the rotating shaft of the motor. The bearing section has a first fitting section of circular shape rotatably supporting the entire peripheral face of the rotating shaft, a second fitting section extending towards an outer edge of the housing from the peripheral edge of the first fitting section, and having an arcuate face formed to identical radial length as the first fitting section, and a heat-radiating section adjacent to the second fitting section in the circumferential direction, formed by a slot cut out in a predetermined direction, and adapted to expose a portion of the outside peripheral face of the rotating shaft through the housing.

10 Claims, 7 Drawing Sheets

IMAGE FORMING APPARATUS EQUIPPED WITH LIGHT SCANNING DEVICE

INCORPORATION BY REFERENCE

This application is based on and claims the benefit of priority from Japanese Patent Application No. 2011-238203 filed on Oct. 31, 2011, the contents of which are hereby incorporated by reference.

BACKGROUND

The present disclosure relates to a light scanning device for forming an image through scanned exposure on a scanned face, and to an image forming apparatus, such as a copier, printer, or fax, or an all-in-one device thereof, equipped with the device.

The light scanning device employed in the image forming apparatus forms a latent image on an image carrier by scanned exposure of the surface of the image carrier. Because the image carrier undergoes scanned exposure by a light beam, when the light beam is deflected, a rotating multifaceted mirror such as a polygon mirror is rotated at high speed, and a rotating shaft of a motor that drives rotation of the rotating multifaceted mirror, as well as a bearing thereof, emit heat. Additionally, electronic control components on circuit boards, such as a drive circuit for controlling driving of the motor, emit heat as well. The heat generated by the motor and electronic control components becomes trapped inside a housing of the light scanning device, and the housing reaches high temperature. When the housing reaches high temperature, there is a risk that lenses, mirrors, and other optical members housed inside the housing will experience heat deformation together with the housing, and that, due to heat deformation of the housing and the optical members, a satisfactory latent image can no longer be formed on the surface of the image carrier.

Various techniques for holding down the rise in temperature of the light scanning device due to heat generated by the motor and electronic control components are known in the related art. In a first light scanning device, an opening is formed in a bottom part of the housing, and a substrate is attached to this opening. To a lower face side of the substrate is disposed a power section of a motor, such as a coil and magnets, and a drive circuit for driving the motor, while a rotating multifaceted mirror is secured to a motor rotating shaft passed through the substrate and projecting to an upper face side thereof. In so doing, the power section and the drive circuit of the motor, and the inside of the housing, are separated by the substrate, holding down infiltration of heat generated by the power section and the drive circuit of the motor into the housing.

A second light scanning device is equipped with a housing, a lid member providing closure to the interior of the housing, and an optical system and a motor block housed in the interior of the housing. The motor block is constituted to have a polygon motor equipped with a polygon mirror, a metal plate attached to the housing and supporting the polygon motor, and a metal cover covering the polygon motor and secured to the plate. The plate is furnished with a heat-radiating fin that is exposed to the outside through the housing. The cover is furnished with a heat-radiating fin that is exposed to the outside through the lid member, and heat generated by the polygon mirror is radiated to the outside by these heat-radiating fins.

A third light scanning device is equipped with a housing, a lid member closing off the interior of the housing, and an optical system and a motor block housed in the interior of the housing. The motor block is constituted to have a polygon mirror, a polygon motor for driving rotation of the polygon mirror, a rotating shaft of the polygon motor, and a bearing section for supporting the rotating shaft. The bearing section is attached to the housing via a motor attachment panel, and on the bottom face of the bearing section there is arranged a contact member of round columnar shape, having higher thermal conductivity and higher thermal capacity than the housing. The contact member is urged by a spring member towards the axial direction of the rotating shaft, and contacts the bottom face of the bearing section under pressure, thereby absorbing heat from the motor block, and reducing conduction of heat from the motor block to the housing.

In the first and second light scanning devices, the lenses, mirrors, and other such optical members are retained by the housing, whereas the polygon motor having the polygon mirror is retained by an intermediate member, such as a substrate, plate, or the like, the intermediate member being attached to the housing. Therefore, due to the interposition of the intermediate member, the accuracy of disposition of the optical members with respect to the polygon mirror decreases. Normally, to obtain high accuracy of disposition of the optical members and the polygon mirror, it is necessary for the accuracy of manufacturing and assembly of the members to be satisfactory, as well as for the accuracy of measurement of the positions of the members to be satisfactory. In the first and second light scanning devices, in a case of measuring the position of a retaining section for an optical member, for example, a measurement is made of the dimensions from the attachment section of the housing for attaching the intermediate member (for example, a screw hole) to the retaining section for the optical member, whereas in a case of measuring the position of a retaining section for the polygon mirror, a measurement is made of the dimensions from the attachment section of the intermediate member for attaching the housing (for example, an attachment hole opposing the screw hole) to the retaining section of the polygon mirror. A risk is presented in that, in order to measure the dimensions between the retaining sections for the optical members and the polygon mirror via the intermediate member, the accuracy with which the dimensions between the retaining sections are measured will decline. This lowers the accuracy of disposition among the optical members and the polygon mirror when the optical members and the polygon mirror are attached to the light scanning device chassis, posing the inconvenience that a satisfactory latent image can no longer be formed on the latent image carrier.

An inconvenience encountered with the third light scanning device is that the device has a large size and complex constitution, due to the arrangement of the contact member for absorbing heat from the motor block.

SUMMARY

An object of the present disclosure is to offer a light scanning device that, by a simple constitution, sufficiently minimizes temperature rise within the housing, and in which optical components or the like are disposed accurately in the housing, as well as an image forming apparatus equipped therewith.

The light scanning device according to a first aspect of the present disclosure is equipped with: a rotating multifaceted mirror that deflects a light beam from a light source section and scans a scanned face using the light beam, a lens for focusing onto the scanned face the light beam that has been deflected and scanned by the rotating multifaceted mirror, a motor for driving rotation of the rotating multifaceted mirror, the motor having a rotating shaft to which the rotating multifaceted mirror is secured, and a housing for housing the lens, the rotating multifaceted mirror, and the motor, the housing having a bearing section that rotatably supports the entire peripheral face of the rotating shaft. The bearing section has a first fitting section of circular shape rotatably supporting the entire outside peripheral face of the rotating shaft, a second fitting section extending towards an outer edge of the housing from the peripheral edge of the first fitting section, and having an arcuate face formed to identical radial length as the first fitting section, and a heat-radiating section adjacent to the second fitting section in the circumferential direction, the heat-radiating section formed by a slot cut out in a predetermined direction, and adapted to expose a portion of the outside peripheral face of the rotating shaft through the housing.

Further objects of the present disclosure, and specific advantages obtained from the present disclosure, will be apparent from the description of the embodiments described hereinbelow.

DETAILED DESCRIPTION

Whereas the preferred embodiments of the present disclosure are described hereinbelow with reference to the drawings, the present disclosure is not limited by these embodiments, nor are the disclosed purposes, the terminology shown herein, or other matter limited thereto.

First Embodiment

Figure 1:
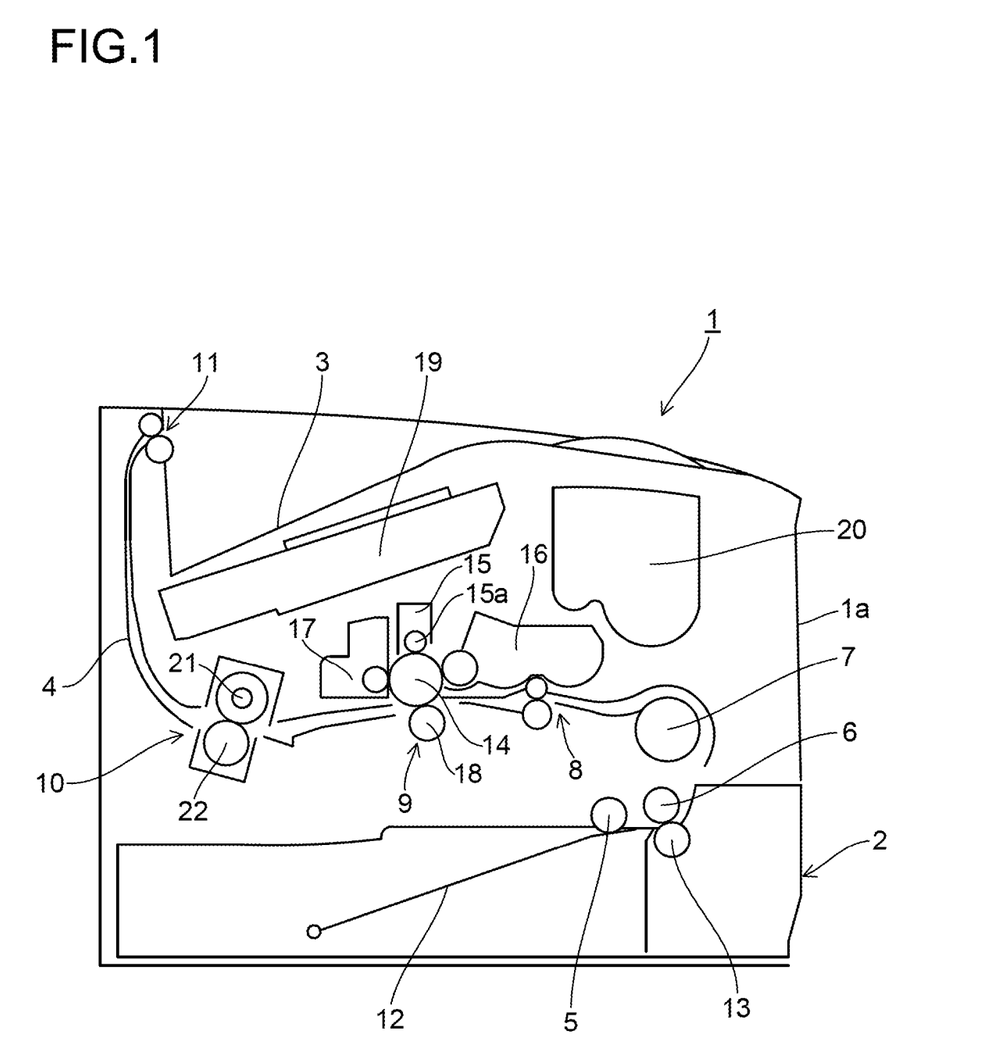
FIG. 1 is a cross sectional view showing the constitution of an image forming apparatus equipped with a light scanning device according to a first embodiment of the present disclosure.

FIG. 1 is cross sectional view showing the overall constitution of an image forming apparatus equipped with a light scanning device according to an embodiment of the present invention, and depicts the right side as being the front side of the image forming apparatus. A paper supply cassette 2 that contains a stack of paper is disposed in the lower section of a device chassis 1a of the image forming apparatus 1. Above the paper supply cassette 2, there is formed a paper conveyance path 4 that extends substantially horizontally from the front to the back of the device chassis 1a, and further extends upward to reach a paper ejection section 3 formed on the upper face of the device chassis 1a. Along this paper conveyance path 4 are disposed, in order from the upstream side, a pickup roller 5, a feed roller 6, an intermediate conveyance roller 7, a resist roller pair 8, an image formation section 9, a fixation section 10, and a discharge roller pair 11.

The paper supply cassette 2 is furnished with a paper stacking panel 12 rotatably supported with respect to the paper supply cassette 2. The constitution is such that the paper stacked on the paper stacking panel 12 is transported towards the paper conveyance path 4 by the pickup roller 5, and in a case in which multiple sheets of paper have been transported at the same time by the pickup roller 5, the paper is manipulated by the feed roller 6 and a retard roller 13 such that only the single uppermost sheet is conveyed. The paper having been transported to the paper conveyance path 4 undergoes a change in the conveyance direction towards the back of the device chassis 1a by the intermediate conveyance roller 7 and is conveyed to the resist roller pair 8, where the timing is adjusted by the resist roller pair 8, and the paper is supplied to the image formation section 9.

The image formation section 9 is designed to form a predetermined toner image on the paper by an electrophotographic process, and is constituted by a photoreceptor 14, which is an image carrier that is supported in clockwise-rotatable fashion in FIG. 1, and, disposed about the perimeter of this photoreceptor 14, a charging device 15, a developing device 16, a cleaning device 17, a transfer roller 18 disposed so as to face the photoreceptor 14 across the paper conveyance path 4, and a light scanning device 19 disposed above the photoreceptor 14. A toner container 20 for resupplying the developing device 16 with toner is disposed above the developing device 16.

The charging device 15 is equipped with a conductive rubber roller 15a, and this conductive rubber roller 15a is disposed touching the photoreceptor 14. When the photoreceptor 14 rotates, the conductive rubber roller 15a undergoes following rotation while in contact with the surface of the photoreceptor 14, at which time a predetermined voltage is applied to the conductive rubber roller 15a, to thereby charge the surface of the photoreceptor 14 uniformly.

Next, an electrostatic latent image based on input image data is formed on the photoreceptor 14 by a light beam outputted by the light scanning device 19, and toner is deposited on the electrostatic latent image by the developing device 16, forming a toner image on the surface of the photoreceptor 14. Paper is then supplied at predetermined timing from the resist roller pair 8 to a nip section (transfer position) of the photoreceptor 14 and the transfer roller 18, and the toner image on the surface of the photoreceptor 14 is transferred onto the paper by the transfer roller 18.

The paper onto which the toner image has been transferred in the image formation section 9 is heated and pressed by a heated roller 21 with which the fixation section 10 is equipped, and a pressure roller 22 that is pressed into contact against this heated roller 21, fixing the toner image.

The paper on which an image has been formed is discharged to the paper ejection section 3 by the discharge roller pair 11. Meanwhile, any toner remaining on the surface of the photoreceptor 14 subsequent to transfer is removed by the cleaning device 17, whereupon the photoreceptor 14 is recharged by the charging device 15, and image formation is performed analogously thereafter.

Figure 2:
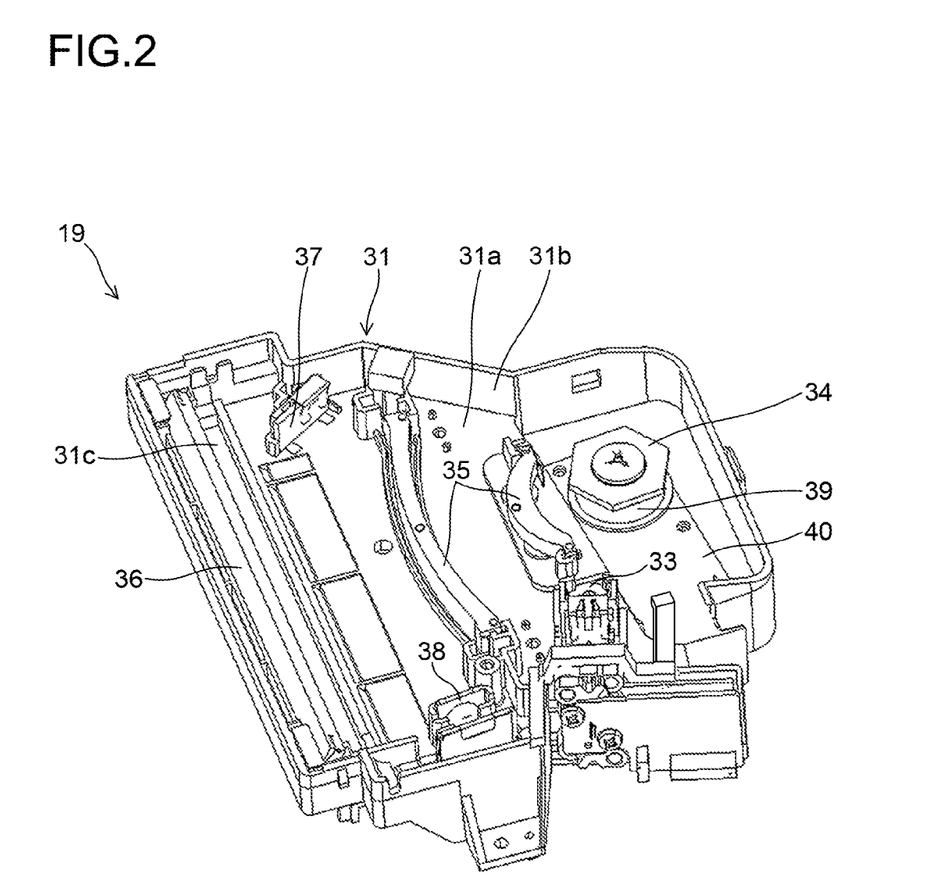
FIG. 2 is a perspective view showing the light scanning device according to the first embodiment of the present disclosure.

FIG. 2 is a perspective view showing the light scanning device 19 employed in the image forming apparatus 1. In FIG. 2, the top lid of the housing has been removed in order to show the constitution of the interior of the light scanning device 19.

The light scanning device 19 is equipped with a light source section 33, a polygon mirror 34 which is a rotating multifaceted mirror, a polygon motor 39 for driving rotation of the polygon mirror 34, and a scanning optical system 35, as well as with a bend mirror 36 and a detection sensor 38.

The light source section 33 has a light source such as a laser diode or the like for outputting laser light, and a cylindrical lens, collimator lens, or the like for shaping the beam diameter of the laser light. A light beam that has been modulated based on image data is outputted.

The polygon mirror 34 is rotated at a predetermined speed by the polygon motor 39, and the light beam output by the light source section 33 is deflected by a reflecting mirror face on the side face. Driving of the polygon motor 39 is controlled by a driver circuit furnished to a circuit board 40.

The scanning optical system 35 is constituted from a plurality of lenses, and is adapted to convert the light beam reflected by the polygon mirror 34 so as to effect scanning thereof at a constant speed, as well as to focus the light beam onto a scanned face. The light beam exiting the scanning optical system 35 is reflected by bend mirror 36 towards the lower side of the scanning optical system 35, and guided to the photoreceptor 14 (see FIG. 1).

The detection sensor 38 outputs a signal for controlling the exposure range in the scanning direction, and receives the light beam having passed through the scanning optical system 35 via a detection mirror 37 disposed outside the exposure range.

In the aforementioned constitution, the light source section 33 outputs to the polygon mirror 34 a light beam that has been modulated based on image data. The polygon mirror 34 reflects the light beam from the light source section 33, and deflects and scans the reflected light through rotation thereof. The scanning optical system 35 converts the light beam reflected by the polygon mirror 34 to a constant-velocity scan, which is focused onto the scanned face, i.e., the photoreceptor 14 (see FIG. 1), via the bend mirror 36. The light scanning device 19 thereby carries out scanned exposure of a predetermined range on the photoreceptor 14 in the scanning direction, forming an electrostatic latent image on the photoreceptor 14.

The light source section 33, the polygon mirror 34, the polygon motor 39, and the scanning optical system 35, the bend mirror 36 are arranged within the housing 31.

The housing 31 is formed to a predetermined shape from a resin, and has a bottom wall section 31a, a side wall section 31b rising up from the peripheral edge of the bottom wall section 31a, and a top lid, not illustrated, attached to the top edge of the side wall section 31b. The light source section 33, the polygon mirror 34, the polygon motor 39, the scanning optical system 35, and the bend mirror 36 are housed inside a space formed by the bottom wall section 31a, the side wall section 31b, and the top lid.

The scanning optical system 35, the detection mirror 37, and the detection sensor 38 are secured at predetermined positions on the bottom wall section 31a. The bend mirror 36 is secured to the bottom wall section 31a at an incline of a predetermined angle with respect to the bottom wall section 31a, in order to reflect the light beam towards the photoreceptor 14 via an exit window 31c (see FIG. 1).

The polygon mirror 34 is integrally attached to the rotating shaft of the polygon motor 39, and the polygon motor 39 is secured to the bottom wall section 31a, with the circuit board 40 interposed therebetween. The circuit board 40 has an on-board driver IC or the like for controlling driving of rotation of the polygon motor 39, and is secured to the bottom wall section 31a. The circuit board 40 may instead be arranged in some other portion of the bottom wall section 31a, or arranged on the top section of the housing 31, such as the top lid.

When the polygon motor 39 rotates at high speed for a long time, the coil or another part of the polygon motor 39 emits heat, the heat being conducted to the rotating shaft. Heat is emitted as well from the driver circuit or another part of the circuit board 40, heating up the inside of the housing 31.

Figure 3:
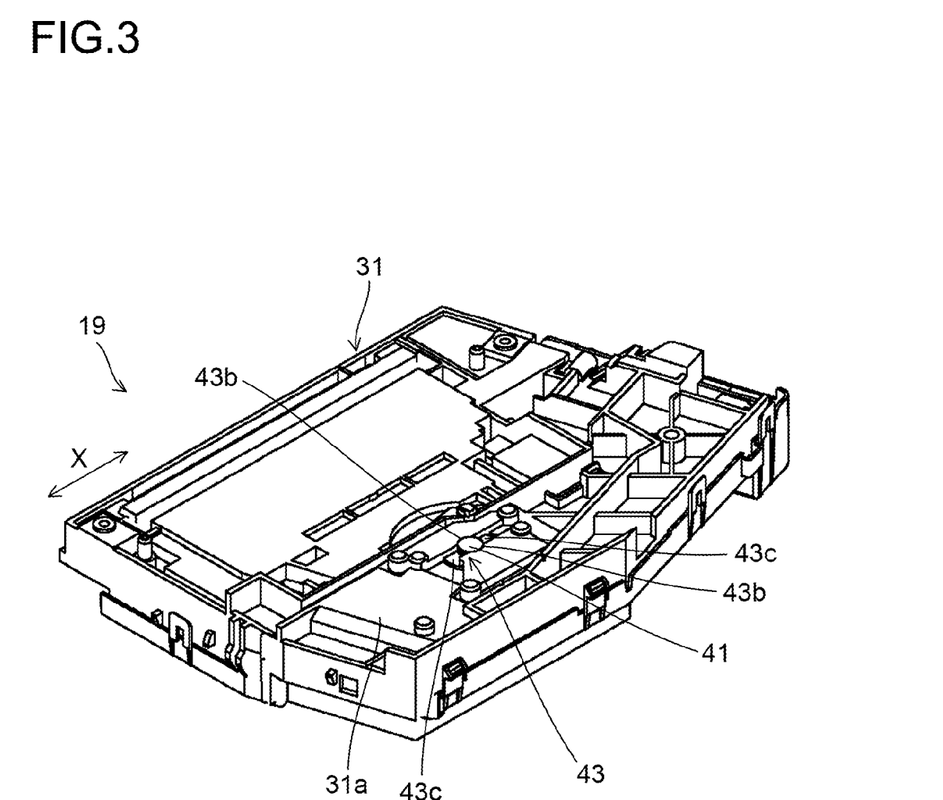
FIG. 3 is a perspective view showing the bottom face section of the light scanning device according to the first embodiment of the present disclosure.
Figure 4:
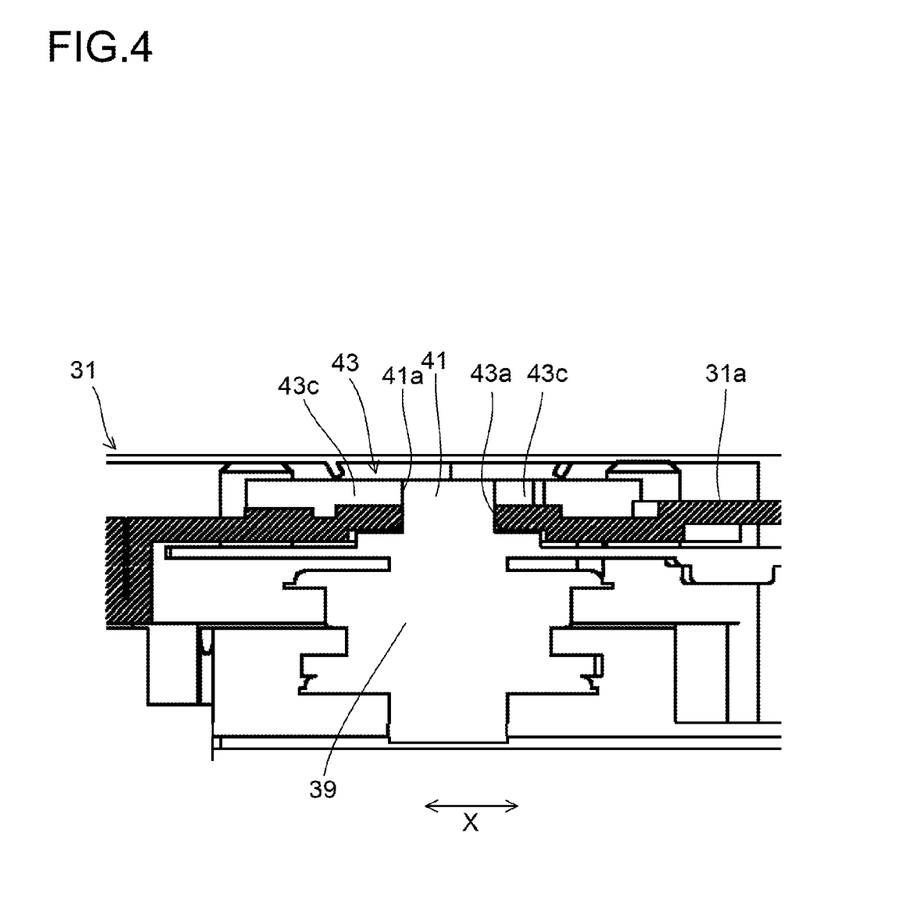
FIG. 4 is a schematic view showing the vicinity of a polygon mirror attachment section of the light scanning device according to the first embodiment of the present disclosure.
Figure 5:
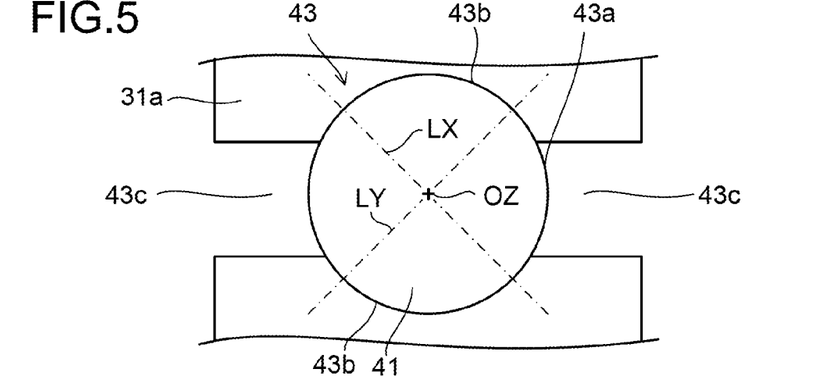
FIG. 5 is a plan view showing a bearing section of a rotating shaft of a polygon motor of the light scanning device according to the first embodiment of the present disclosure.

In the present embodiment, in order to sufficiently minimize rise in temperature within the housing 31, the rotating shaft of the polygon motor 39 is arranged as shown in FIGS. 3 to 5. FIG. 3 is a perspective view showing the bottom face section of the housing 31, FIG. 4 is a schematic view showing the vicinity of a support section of the rotating shaft 41 of the polygon motor 39, and FIG. 5 is a plan view showing a bearing section 43 that supports the rotating shaft 41. FIG. 4 is a cross section of a vicinity including the rotating shaft 41, taken in the X direction in FIG. 3.

As shown in FIG. 3, the rotating shaft 41 of the polygon motor 39 (see FIG. 4) is exposed to the outside through the bottom wall section 31a, and is rotatably supported by the bearing section 43, which has been formed on the bottom wall section 31a of the housing 31.

The bearing section 43 has a first fitting section 43a (see FIG. 4), second fitting sections 43b, and heat-radiating sections 43c.

As shown in FIG. 4, the first fitting section 43a has predetermined length in the axial direction of the rotating shaft 41, and fits with the outside peripheral face 41a of the rotating shaft 41 about the entire outside peripheral face thereof, rotatably supporting the rotating shaft 41. The second fitting sections 43b and the heat-radiating sections 43c (see FIGS. 3 and 5) are formed to the outer edge side (the upward direction in FIG. 4) of the first fitting section 43a.

The heat-radiating sections 43c are formed by slots adjacent in the circumferential direction to the second fitting sections 43b, and cut out in the X direction (see FIG. 3), to expose portions of the outside peripheral face 41a of the rotating shaft 41 to the outside from the bottom wall section 31a. By virtue of the outside peripheral face 41a of the rotating shaft 41 being exposed from the housing 31, heat conducted to the rotating shaft 41 from the coil or another part of the polygon motor 39 is radiated to the outside from the outside peripheral face 41a of the rotating shaft 41. Because heat generated by the polygon motor 39 is radiated from the outside peripheral face 41a of the rotating shaft 41 in this fashion, this design can be implemented in a wide variety of polygon motors, such as motors of a type in which the end face of the rotating shaft 41 is oil sealed, which makes it difficult for heat to radiate from the end face of the rotating shaft 41, or the like.

The heat-radiating sections 43c are arranged at two positions in mutual opposition, with the rotating shaft 41 therebetween. The device chassis 1a (see FIG. 1) is furnished with a fan for blowing cold air, and by having the cold air from the fan blow from one of the heat-radiating sections 43c towards the other heat-radiating section 43c, heat is radiated at a more satisfactory level from the outside peripheral face 41a of the rotating shaft 41.

The two second fitting sections 43b are formed at positions adjacent in the circumferential direction to the two heat-radiating sections 43c (see FIGS. 3 and 5).

As shown in FIG. 5, the second fitting sections 43b extend from the first fitting section 43a towards an outer edge of the bottom wall section 31a (the upward direction in FIG. 4), and are formed by arcuate faces identical in radial length to the first fitting section 43a. The two second fitting sections 43b extend as far as the axial end face of the rotating shaft 41 and partially fit with the rotating shaft 41, thereby rotatably supporting the rotating shaft 41. In this way, the rotating shaft 41, by virtue of having the heat-radiating sections 43c, radiates heat in satisfactory fashion from the outside peripheral face 41a of the rotating shaft 41 via the heat-radiating sections 43c. The fitting section of the rotating shaft 41 is longer in the axial direction by virtue of having the first fitting section 43a and the second fitting sections 43b, and the rotating shaft 41 can rotate in a stable fashion.

Moreover, the arcuate faces of the second fitting sections 43b have predetermined arcuate length, such that formation of the heat-radiating sections 43c is possible. In specific terms, the arcuate length refers to the length of the arcuate face of the second fitting sections 43b in the circumferential direction, the arcuate face of the second fitting sections 43b having an arcuate length equal to ½ or more the circumferential length of the first fitting section 43a. In a constitution having two second fitting sections 43b, the sum of the arcuate length of the arcuate faces of the two second fitting sections 43b has a length equal to ½ or more the circumferential length of the first fitting section 43a. Furthermore, within a plane that has two mutually orthogonal straight lines LX, LY passing through the center line OZ of the first fitting section 43a, and that is perpendicular to the center line OZ (the plane in FIG. 5), the arcuate faces of the second fitting sections 43b are furnished so as to intersect the straight lines LX, LY. By adopting such a constitution, it is possible to correctly establish a measurement reference for the purpose of measuring the dimensions of the portions of the lens retaining sections of the scanning optical system 35, or the like (see FIG. 2), with respect to the bearing section 43.

Normally, in order to form a satisfactory latent image on the photoreceptor 14 (see FIG. 1), it is important that the lenses of the scanning optical system 35 (see FIG. 2) are individually attached at predetermined positions on the housing 31, and moreover that the scanning optical system 35, the bend mirror 36 (see FIG. 2), and other optical members are attached at predetermined positions on the housing 31, with respect to the polygon mirror 34. Therefore, it is necessary to correctly measure the positions of the individual retaining sections for attachment of the polygon mirror 34, and the scanning optical system 35 and other optical members, in the housing 31. In order to measure the positions of the retaining sections for attachment of the scanning optical system 35 and other optical members, with respect to the retaining section that attaches the polygon mirror 34, measurements are made with reference to the bearing section 43 of the rotating shaft 41, that is, the first and second fitting sections 43a, 43b.

For example, employing a measuring instrument that measures dimensions based on the position of a probe when the probe is placed in contact with a section being measured, the dimensions of the retaining sections of the optical members with respect to the first and second fitting sections 43a, 43b are measured. In this measurement procedure, firstly, the center axis OZ of the first and second fitting sections 43a, 43b is established as a measurement reference. To establish the measurement reference, the probe of the measuring instrument is operated, for example, in the LX direction in FIG. 5, and is touched against the first and second fitting sections 43a, 43b while measuring the coordinates thereof. Next, the probe of the measuring instrument is operated in the LY direction, which is an orthogonal direction to the LX direction, and is touched against the first and second fitting sections 43a, 43b while measuring the coordinates thereof. Based on the four coordinates measured with the probe touching against the first and second fitting sections 43a, 43b, the coordinates of the center axis OZ of the first and second fitting sections 43a, 43b are calculated, and the coordinates of the center axis OZ so calculated are designated as reference coordinates. Next, the probe is touched against the retaining sections of the optical members, and the coordinates of the optical members are measured. The positions of the retaining sections of the optical members with respect to the first and second fitting sections 43a, 43b are measured based on these reference coordinates, and the coordinates of the retaining sections of the optical members.

In a case in which the probe is touched against the first and second fitting sections 43a, 43b in order to measure the reference coordinates, the technician taking the measurements operates the probe in the LX direction and the LY direction by sight. During this measurement work, provided that the arcuate length of two second fitting sections 43b is sufficiently long, and that the arcuate faces thereof are furnished so as to intersect the two straight lines LX, LY, workability for the purpose of manual operation of the probe will be satisfactory. Moreover, when the second fitting sections 43b are established to have great length in the axial direction, for example, 1 mm or more, even when the end faces of the second fitting sections 43b have taken on a somewhat rounded state, or burring has occurred, during molding of the housing 31, the rounding or burrs may be avoided, making it possible for the probe to be reliably touched against the first and second fitting sections 43a, 43b. In this way, it is possible to correctly establish a measurement reference for measuring the dimensions of the portions of the lens retaining sections of the scanning optical system 35 (see FIG. 2) or the like with respect to the bearing section 43, in order to hold down measurement error of the center axis OZ of the bearing section 43 to a low level.

By attaching the polygon motor 39 and the optical members to attachment sections of the housing 31 measured in this manner, the polygon motor 39 and the optical members may be disposed in the housing 31 with high positional accuracy. Moreover, because the rotating shaft 41 of the polygon motor 39 and the optical members are retained by the housing 31, the disposition accuracy of the optical members with respect to the polygon motor 39 is satisfactory.

Figure 6:
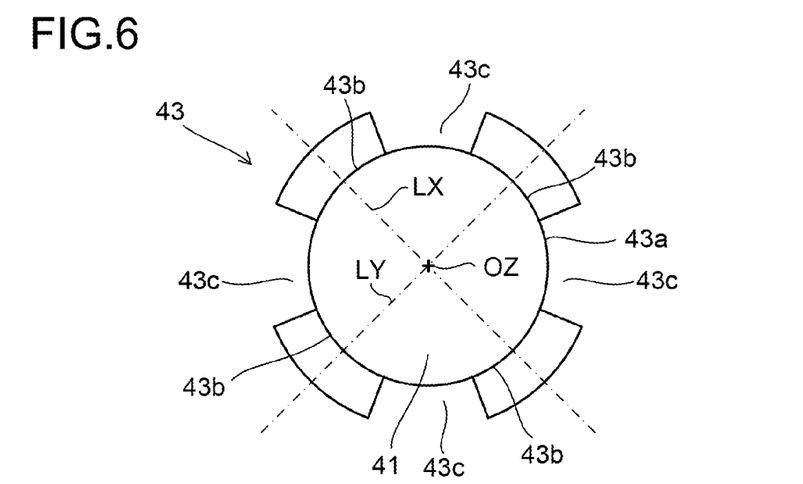
FIG. 6 is a plan view showing a modification of the bearing section of the rotating shaft of the polygon motor of the present disclosure.

The bearing section 43 may also be constituted as shown in FIG. 6. FIG. 6 is a plan view showing a modification of the bearing section 43. In this modification, four of the second fitting sections 43b have been formed.

Two of the second fitting sections 43b are formed in the direction of the straight line LX, the second fitting sections 43b being disposed with arcuate faces thereof intersecting the straight line LX, and in mutual opposition. Another two of the second fitting sections 43b are formed in the direction of the straight line LY, the second fitting sections 43b being disposed with arcuate faces thereof intersecting the straight line LY, and in mutual opposition. The sum of the arcuate length of the arcuate faces of the four second fitting sections 43b preferably has a length that is equal to ½ or more the circumferential length of the first fitting section 43a. To establish the center axis OX of the first and second fitting sections 43a, 43b as the measurement reference, the probe of the measuring instrument is operated in mutually orthogonal directions while being touched against the first and second fitting sections 43a, 43b, and the coordinates of the center axis OX are calculated based on four coordinates measured in this way. By virtue of this constitution, workability for the purpose of measuring the measurement reference of the housing 31 is satisfactory, making it possible to correctly establish a measurement reference for measuring the dimensions of the portions of the lens retaining sections of the scanning optical system 35 (see FIG. 2) or the like with respect to the bearing section 43.

The heat-radiating sections 43c are formed in spaces in the circumferential direction between adjacent second fitting sections 43b. Consequently, four heat-radiating sections 43c are formed, with two of the heat-radiating sections 43c disposed in mutual opposition with the rotating shaft 41 therebetween, and another two of the heat-radiating sections 43c disposed in mutual opposition with the rotating shaft 41 therebetween. By virtue of having the four heat-radiating sections 43c, heat generated by the polygon motor 39 is radiated in a satisfactory manner, from the outside peripheral face 41a of the rotating shaft 41 via the heat-radiating sections 43c. Moreover, by virtue of having both the first fitting section 43a and the second fitting sections 43b, the fitting section of the rotating shaft 41 is longer in the axial direction, and the rotating shaft 41 can rotate in a stable fashion.

Figure 7:
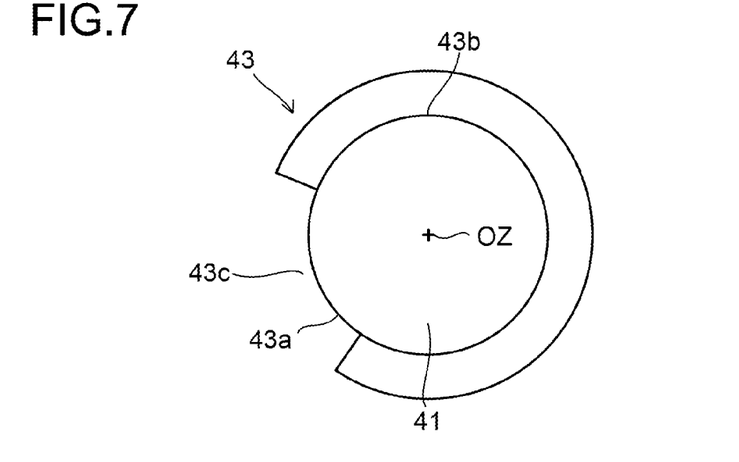
FIG. 7 is a plan view showing another modification of the bearing section of the rotating shaft of the polygon motor of the present disclosure.

The bearing section 43 may also be constituted as shown in FIG. 7. FIG. 7 is a plan view showing another modification of the bearing section 43. In this modification, a single second fitting section 43b and a single heat-radiating section 43c are formed.

The second fitting section 43b has an arcuate length equal to ½ or more the circumferential length of the first fitting section 43a, such that formation of the heat-radiating section 43c is possible. To establish the center axis OX of the first and second fitting sections 43a, 43b as the measurement reference, the probe of the measuring instrument is operated in mutually orthogonal directions while being touched against the first and second fitting sections 43a, 43b, and the coordinates of the center axis OX are calculated based on four coordinates measured in this way. By virtue of this constitution, workability for the purpose of measuring the measurement reference of the housing 31 is satisfactory, making it possible to correctly establish a measurement reference for measuring the dimensions of the portions of the lens retaining sections of the scanning optical system 35 (see FIG. 2) or the like with respect to the bearing section 43.

By virtue of having the heat-radiating section 43c at a position adjacent in the circumferential direction to the second fitting section 43b, heat generated by the polygon motor 39 is radiated in a satisfactory manner, from the outside peripheral face 41a of the rotating shaft 41 via the heat-radiating section 43c. Moreover, by virtue of having both the first fitting section 43a and the second fitting section 43b, the fitting section of the rotating shaft 41 is longer in the axial direction, and the rotating shaft 41 can rotate in a stable fashion.

Second Embodiment

Figure 8:
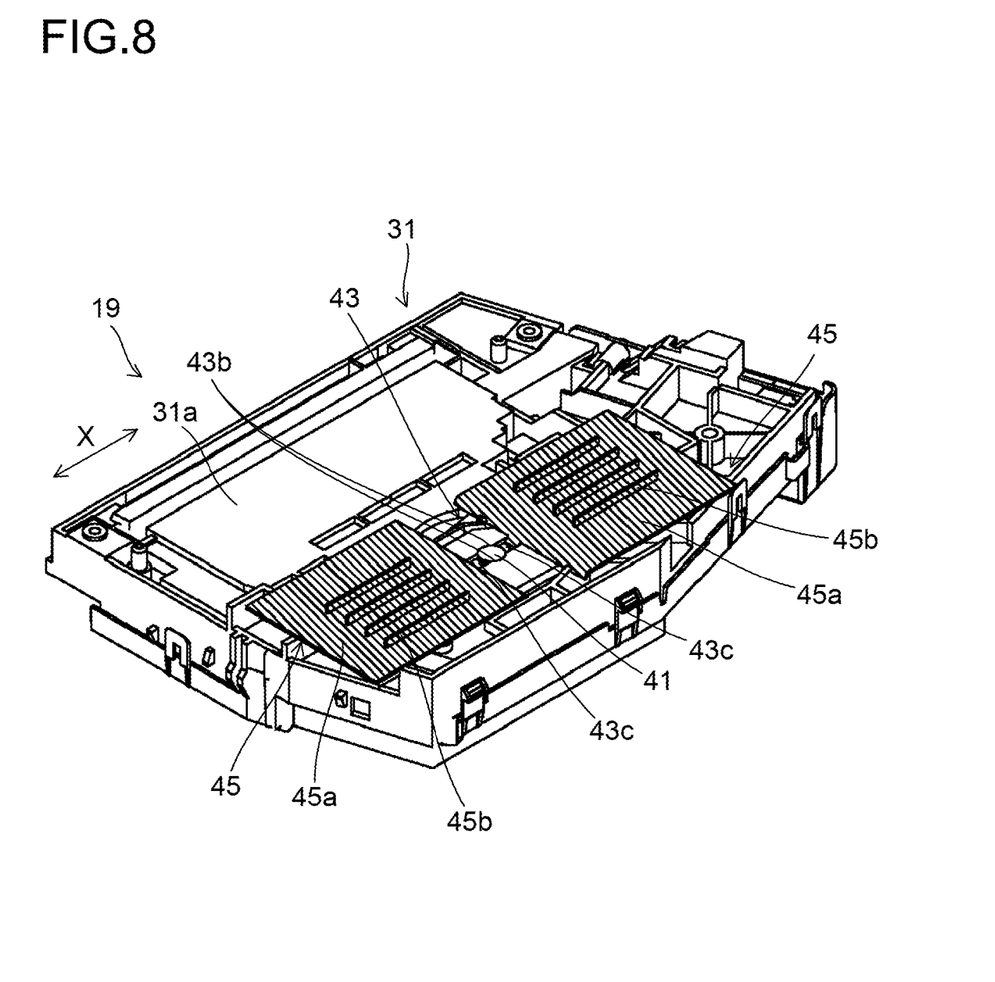
FIG. 8 is a perspective view showing the bottom face section of a light scanning device according to a second embodiment of the present disclosure, furnished with heat-radiating members.
Figure 9:
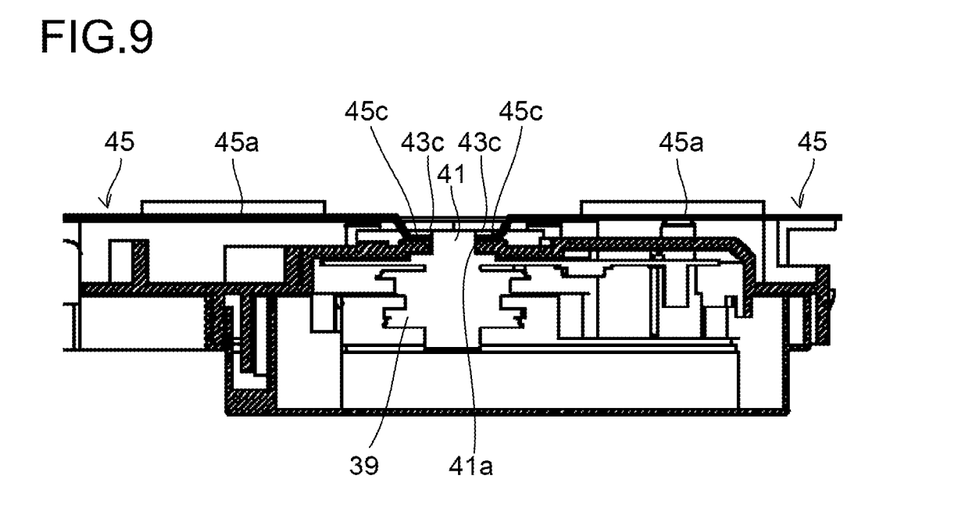
FIG. 9 is a cross sectional view showing a bearing section furnished with heat-radiating members according to the second embodiment of the present disclosure.

FIGS. 8 and 9 are a perspective view and a cross sectional view showing the vicinity of a bearing section 43 according to a second embodiment. FIG. 9 is a cross section of a vicinity including the rotating shaft 41, taken in the X direction in FIG. 8. The second embodiment is a constitution in which the first embodiment is further equipped with heat-radiating members. In the following description, the constitution and disposition of the heat-radiating members are primarily described, omitting descriptions of portions identical to the first embodiment.

As shown in FIG. 8, the bearing section 43 is formed in the bottom wall section 31a of the housing 31, and the rotating shaft 41 of the polygon motor 39 is rotatably supported by the bearing section 43. As in the first embodiment, the bearing section 43 has a first fitting section 43a (see FIG. 4), a pair of second fitting sections 43b, and a pair of heat-radiating sections 43c. The pair of second fitting sections 43b are disposed in mutual opposition, and the pair of heat-radiating sections 43c are disposed in mutual opposition with the rotating shaft 41 therebetween.

Two heat-radiating members 45 are attached to the outer face side of the bottom wall section 31a. The heat-radiating members 45 are formed of aluminum, iron, or other metal material having greater thermal conductivity than the material of the housing 31, and have a basal section 45a of generally rectangular planar shape, a plurality of heat-radiating fins 45b, and a touching section 45c (see FIG. 9) that contacts the rotating shaft 41.

The basal section 45a is attached to the bottom wall section 31a by a screw or the like, and has an opposing face facing towards the bottom wall section 31a, and an outer face on the opposite side therefrom, with the heat-radiating fins 45b being formed on this outer face. The heat-radiating fins 45b are formed to project out from the outer face of the basal section 45a, as well as being formed to extend in the direction in which the pair of heat-radiating sections 43c are disposed (the X direction in FIG. 8).

As shown in FIG. 9, the touching section 45c is formed in the shape of an inflected tongue piece, one end section of which extends from one side section of the basal section 45a, and the other end section of which is arranged in the space of the heat-radiating sections 43c and contacts the outside peripheral face 41a of the rotating shaft 41. So as to not impair rotation of the rotating shaft 41, the other end section of the touching section 45c is formed to an arcuate shape conforming to the outside peripheral face 41a of the rotating shaft 41, in order to provide contact over a wide area against the outside peripheral face 41a of the rotating shaft 41.

Heat conducted from the polygon motor 39 to the rotating shaft 41 is radiated to the outside from the outside peripheral face 41a of the rotating shaft 41 via the heat-radiating sections 43c, and is conducted from the touching section 45c to the basal section 45a of the heat-radiating members 45, and radiated to outside the housing 31. Furthermore, the heat of the basal section 45a is conducted to the heat-radiating fins 45b, and radiated to outside the housing 31. In this way, rise in temperature within the housing 31 is sufficiently minimized.

By further furnishing the device chassis 1a with a fan for blowing cold air, and having cold air from the fan blow towards the direction in which the plurality of heat-radiating fins 45b are disposed, heat may be radiated at a more satisfactory level from the outside peripheral face 41a of the rotating shaft 41.

Whereas the second embodiment shows a constitution furnished with two heat-radiating members 45, the present invention is not limited thereto, and may instead be constituted by one or the other of the heat-radiating members 45. Moreover, the two heat-radiating members 45 may have an integrated constitution. The heat-radiating fin 45 may be provided singly or as a plurality.

In a case of a constitution in which the bearing section 43 has four heat-radiating sections 43c as shown in FIG. 6, four of the touching sections 45c may be formed on the heat-radiating members 45, with the touching sections 45c contacting the outside peripheral face 41a of the rotating shaft 41 from the spaces between the heat-radiating sections 43c. The number of touching sections 45c furnished may be established, as appropriate, to obtain the desired heat radiation.

The embodiments showed a constitution in which, in order to measure the center axis OZ of the bearing section 43 as a measurement reference during measurement of the dimensions for disposition of sections of the housing 31, the coordinates of the center axis OZ are calculated based on four coordinates of the first and second fitting sections 43a, 43b, obtained by operating the probe of the measuring instrument in mutually orthogonal directions. However, the present invention is not limited to this constitution. The coordinates of the center axis OZ may instead be calculated based on six coordinates obtained by touching the probe of the measuring instrument against three sites on the first and second fitting sections 43a, 43b. In this case, it is possible for the arcuate length of the second fitting sections 43b to be shorter, and for the heat-radiating sections 43c to be wider, increasing the heat radiating effect.

The present invention can be utilized in a light scanning device for forming an image through scanned exposure on a scanned face, an image forming apparatus, such as a copier, printer, or fax, or an all-in-one device thereof, equipped with the same, or in a bar code reader device or projector.

What is claimed is:

1. A light scanning device, including:
a rotating multifaceted mirror that deflects a light beam from a light source section and scans a scanned face using the light beam;
a lens for focusing onto the scanned face the light beam that has been deflected and scanned by the rotating multifaceted mirror;
a motor for driving rotation of the rotating multifaceted mirror, the motor having a rotating shaft to which the rotating multifaceted mirror is secured; and
a housing for housing the lens, the rotating multifaceted mirror, and the motor, the housing having a bearing section for rotatably supporting the rotating shaft of the motor;
the bearing section having:
a first fitting section of circular shape rotatably supporting the entire outside peripheral face of the rotating shaft;
a second fitting section extending towards an outer edge of the housing from the peripheral edge of the first fitting section, and having an arcuate face formed to identical radial length as the first fitting section; and
a heat-radiating section adjacent to the second fitting section in the circumferential direction, the heat-radiating section formed by a slot cut out in a predetermined direction, and adapted to expose a portion of the outside peripheral face of the rotating shaft through the housing.

2. The light scanning device of claim 1,
the arcuate face of the second fitting section having arcuate length equal to ½ or more the circumferential length of the first fitting section.

3. The light scanning device of claim 1,
at least two of the second fitting sections being formed; and, within a plane that has two mutually orthogonal straight lines passing through the center line of the first fitting section, and that is perpendicular to the center line, the arcuate faces of the second fitting sections being furnished so as to intersect the straight lines.

4. The light scanning device of claim 1,
the heat-radiating sections being formed at two positions in mutual opposition interposed by the rotating shaft.

5. The light scanning device of claim 1,
the device being further equipped with a heat-radiating member that has a basal section for attachment to the housing, and a touching section formed extending in the shape of a tongue piece from the basal section and adapted for contacting the outside peripheral face of the rotating shaft from the heat-radiating section; and the heat-radiating member having higher thermal conductivity than the housing.

6. The light scanning device of claim 5,
the heat-radiating member having a heat-radiating fin formed projecting from the outer face of the basal section, the heat-radiating fin extending in the direction in which the heat-radiating section is disposed.

7. The light scanning device of claim 5,
the portion of the touching section contacting the outside peripheral face of the rotating shaft being formed in an arcuate shape.

8. The light scanning device of claim 5,
two of the heat-radiating sections being formed at mutually opposing positions interposed by the rotating shaft; and
the heat-radiating members being furnished in a quantity of two, the heat-radiating members contacting the outside peripheral face of the rotating shaft from the heat-radiating section.

9. An image forming apparatus, equipped with the light scanning device of claim 6, and a fan for forcing air in the direction in which the heat-radiating fin extends.

10. An image forming apparatus, equipped with the light scanning device of claim 1, and an image carrier having the scanned face scanned by a light beam from the light scanning device.

* * * * *